April 22, 1941.  W. E. DIMMOCK  2,239,221
GAS-VOLUME INDICATING GAUGE
Filed Jan. 3, 1939  2 Sheets-Sheet 1
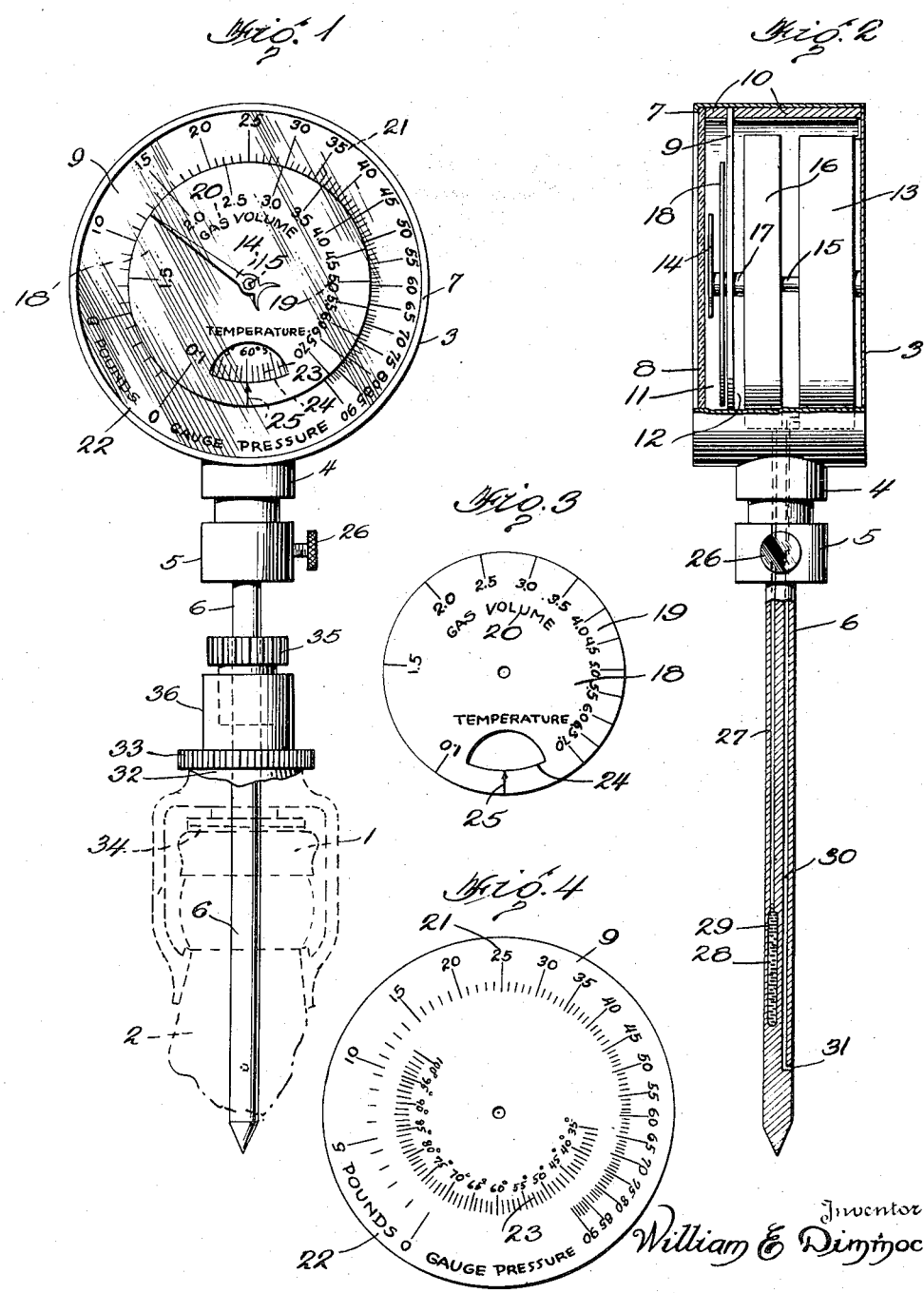

April 22, 1941.  W. E. DIMMOCK  2,239,221
GAS-VOLUME INDICATING GAUGE
Filed Jan. 3, 1939  2 Sheets-Sheet 2
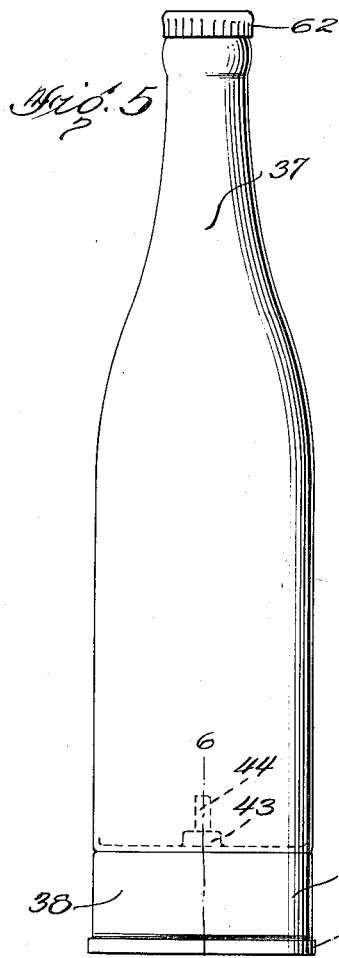
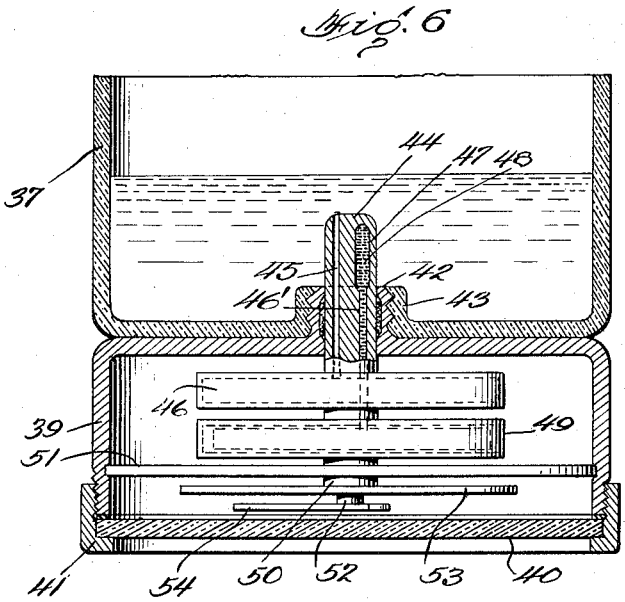
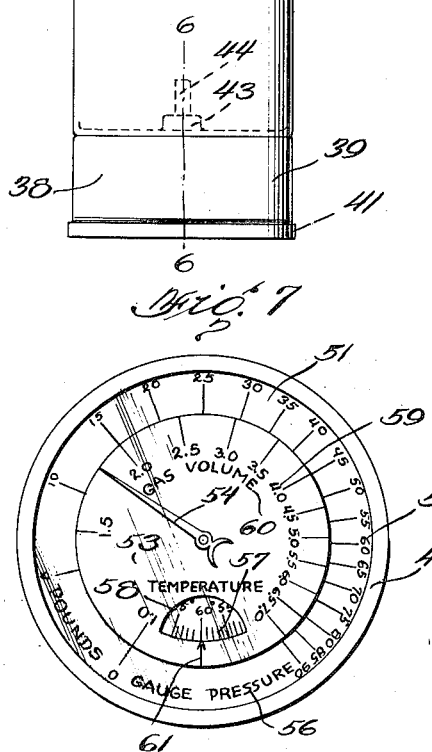
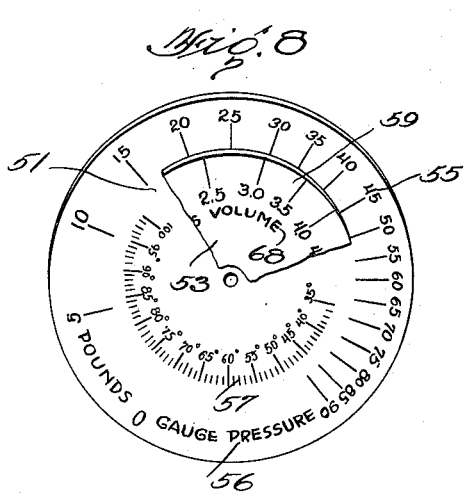
Inventor
William E. Dimmock
By Robert L. Dennison
Attorney Patented Apr. 22, 1941

2,239,221

UNITED STATES PATENT OFFICE 2,239,221

GAS-VOLUME INDICATING GAUGE

William E. Dimmock, College Park, Ga.

Application January 3, 1939, Serial No. 249,076

4 Claims. (Cl. 73—345)

Beverages are spoken of as "carbonated," "sparkling" or "aerated" when they are naturally or artificially impregnated with carbon dioxide gas. The amount of carbon dioxide dissolved by water at atmospheric pressure varies with the temperature; increasing with decreasing temperatures.

In order to exceed the normal amount dissolved at any specific temperature, pressure must be employed in a closed container. This pressure must be maintained at all times, as upon release all excess carbon dioxide will evolve, leaving only the normal amount to be expected at the given temperature.

The amount of carbon dioxide dissolved at any given temperature and pressure is governed by "Henry's law" which states that the solubility of a gas at a given temperature is proportional to the pressure of the gas above the solution. Expressed as a vapor pressure law this states that the partial pressure of a volatile solute from a solution is proportional to its mol fraction, or to its concentration.

It may be safely stated that practically all of the carbonated beverages produced in this and other countries owe their carbon dioxide content to artificial means. The possible exceptions are the secondary fermented beverages that undergo fermentation in closed containers with the evolution of carbon dioxide, and the naturally carbonated mineral waters. Artificial carbonation is achieved by means of a rather elaborate layout consisting of a strong steel cylinder in which the gas is bought and stored; an impregnating device for dissolving the carbon dioxide in water under pressure, called a carbonator; and the filler proper, which dispenses the carbonated water to the bottles where it is mixed with flavoring syrups of various kinds and then is closed with a pressure-resisting crown cap.

The kind or type of flavoring syrup employed more or less dictates the amount of carbon dioxide used for carbonating. The true-fruit beverages usually employing the lowest content and the ginger ales and charged waters, the highest. The unit of measurement for defining the carbon dioxide content of a bottled beverage is called a "gas volume" and is expressed as the ratio by volume between the liquid and the carbon dioxide, reduced to 0° F. temperature and 760 mm pressure.

In order to determine the "gas volume" content of a bottled carbonated beverage, several methods may be employed, ranging from an actual physical measurement of the carbon dioxide by collection over mercury, to an empirical method whereby the actual pressure of the carbon dioxide in the bottle is determined by piercing the crown with a hollow needle which is connected to a pressure gauge. This pressure reading together with the temperature reading of the beverage give the "gas volume" by reference to a specially prepared chart.

These "gas volume" charts are based on Henry's law and usually give values for pressures ranging from zero pounds to 100 pounds in single or double pounds and for temperatures ranging from 32° to 100° F. It will, therefore, be seen that such a chart will list from 3400 to 6800 values, depending on whether the pressures are given in double or single pounds. These values are calculated and given to the nearest $\frac{1}{10}$ volume and range from $\frac{1}{10}$ volume for zero pounds pressure and 100° F. temperature, to $13\frac{6}{10}$ volumes for 100 pounds pressure and 32° F. temperature. It will be seen that the range in "gas volumes" covered is 12.8 volumes (the difference between $\frac{2}{10}$ and $13\frac{6}{10}$ volumes) which means that a maximum of 128 different values are shown, which in turn indicates that most or all of the values are many times repeated, as 3400 to 6800 values are listed.

This multiplication of values naturally complicates the reading of the chart, as quite a large surface area is necessary to list all the values in readable type. It also necessitates a little dexterity in following the pressure and temperature lines vertically and horizontally to the point where they meet; indicating the gas volume. Considering the fact that it is very necessary that bottled carbonated beverages being produced by any given machine be checked very often for correct gas-volume content, it is highly desirable that the test be simplified as much as possible, so that it may be made with the least demand on the operator's time.

The main object of my invention is, therefore, to provide a simpler method and more rapid method for the determining of the gas-volume content of a carbonated beverage. I have accomplished this by combining a pressure gauge and mercury-actuated dial thermometer in such a manner that the thermometer dial (which carries the gas-volume scale) is shifted by changes of temperature and thereby automatically sets the scale in such a position that the hand of the pressure gauge indicates the gas-volume content while at the same time indicating the pressure on another scale.

Another object of the invention is to provide a gauge of this type which is so constructed that the casing for the registering mechanism is mounted at the upper end of the cap-penetrating needle and constitutes a hand-hold by means of which the needle can be easily forced through the cap of a bottle for testing the gas contents of the liquid in the bottle.

Another object of the invention is to so form the needle that in addition to serving as means for puncturing the cap of the bottle, it also serves as a mercury bulb and tube and in addition as a conduit through which gas pressure reaches the mechanism in the casing for registering the gas volume and pressure.

Another object of the invention is to provide a gauge which is very compact in construction and has its dials and its indicating hand or pointer so arranged in relation to each other that gas volume, the pressure, and the temperature of the liquid being tested may be ascertained by merely glancing through the glass front of the casing in which the registering mechanism is mounted.

Another object of the invention is to provide a gauge which instead of being provided with a cap penetrating needle is adapted to be applied to the bottom of a dummy bottle which will be set in place in the line of bottles passing through the bottle-filling and capping machinery.

Another object of the invention is to so construct the gauge that in either the cap puncturing form or the form applied to the bottom of a dummy bottle, a casing encloses the registering mechanism and a shank or needle extends from the casing to enter the bottle through the cap or the bottom of the bottle becomes immersed in the liquid contents of the bottle so that the temperature of the liquid and the volume and pressure of the gas will be indicated by the registering mechanism in the casing.

The invention is illustrated in the accompanying drawings wherein—

Figure 1 is a front elevation of a gauge constructed in accordance with the invention and showing the needle passing through the cap of a bottle indicated by dotted lines.

Figure 2 is a view showing the gauge of Figure 1 partially in side elevation and partially in vertical section.

Figure 3 is a view looking at the front face of one dial of the gauge.

Figure 4 is a view looking at the outer or front face of a larger dial in front of which the smaller dial of Figure 3 is disposed.

Figure 5 is a view in elevation of a dummy bottle having a gauge of the improved construction applied to its bottom.

Figure 6 is a sectional view upon an enlarged scale taken vertically through Figure 5 along line 6—6.

Figure 7 is a view looking at the bottom or outer end of the gauge shown in Figures 5 and 6.

Figure 8 is a view of the dials of Figure 7, the smaller dial being partially broken away.

The gauge illustrated in Figures 1 through 4 is adapted for use by puncturing the metal crown cap 1 of a bottle 2 and includes in its construction a casing 3 which is formed of metal and has a depending neck 4 at the lower end of which is a valve casing 5 from which extends a shank or needle 6 of such length that it can be forced through the cap 1 and extend downwardly in the bottle 2 with its lower portion immersed in the liquid contents of the bottle.

The casing 3 is open at its front and formed with an inwardly projecting marginal flange 7 for holding a closure disk 8 of glass or other transparent material in place. A stationary disk or dial 9 is mounted in the casing between retainer rings 10 and divides the interior of the casing into front and rear compartments 11 and 12, the front compartment being shallow and the rear compartment of considerably greater length as shown in Figure 2. Within the rear compartment, there is mounted a pressure responsive mechanism 13 of a conventional construction for operating a gauge hand 14 carried by the shaft 15 of this mechanism which projects into the front compartment 11. In front of the mechanism 13, there is mounted a mechanism or actuator 16 responsive to pressure exerted resulting from expansion and contraction of mercury, which is also of a conventional construction and has a hollow shaft 17 extending into the front compartment about the shaft 15 and carrying a dial 18 which is in the form of a circular disk as shown in Figure 3 and is disposed in the front compartment between the hand or pointer 14 and the dial or partition 9. The two shafts are concentric to each other but independently rotatable and the dial 18 and hand 14 may thus be adjusted relative to each other and also independently adjusted with respect to the dial or partition 9. The dial 18 is marked about the peripheral portion of its outer or front face to provide a scale 19 indentified as a "gas volume" as shown at 20 and the dial or partition 9 has the peripheral portion of its front face provided with a scale 21 which surrounds the dial or disk 18 with its scale markings in cooperating relation to the periphery of the dial 18 as shown in Figure 1. The scale 21 indicates pounds pressure as shown at 22 and the scales 19 and 21 are in such concentric relation to each other that the hand or pointer 14 may serve to indicate the correct reading of both the gas volume and the pounds pressure when the gauge is in use. The dial or partition 9 also has upon its front face a temperature scale 23 extending in an arcuate path concentric to the scales 21 and 19, the scale 23 being so located upon the partition 9 that it will be exposed through the opening 24 formed in the lower portion of the dial 18. A pointer mark 25 extends radially of the dial 18 midway the length of the lower edge of the opening 24 in cooperating relation to the scale 23, and from an inspection of Figure 1, it will be seen that when the dial 18 is turned with the shaft 17 by the mechanism 16, the temperature of liquid in the bottle will be indicated by the position of the pointer 25 relative to the temperature scale 23.

The shank or needle 6 is formed with a passage 27 having its upper end communicating with the pressure responsive mechanism 16 and its lower end portion enlarged to form a pocket or mercury bulb 28 filled with mercury 29 as shown in Figure 2. The needle is also formed with a longitudinally extending passage or bore 30 constituting a gas passage having its upper end communicating with the pressure responsive mechanism 13 and its lower end provided with a side extension or inlet 31 which opens through a side of the needle. The needle valve 26 carried by the valve casing 5 controls flow of gas through the passage 30 to the pressure responsive mechanism 13. The bulb 28 and the inlet of the passage 30 are so located with respect to the lower end of the needle that when the needle is forced through the cap 1 and extends downwardly into the bottle, they will both be below the surface of the liquid in the bottle and the mercury affected by the temperature of the liquid and cause operation of the mechanism 16 while the mechanism 13 will be operated by the pressure through the passage 30.

When the gauge is in use, the needle 6 which passes through the bore of a clamp 32 of a conventional formation is forced through the cap 1 of the bottle 2 until its lower end portion is submerged in the liquid contents of the bottle as far as desired. The nut 33 is tightened to compress the gasket 34 against the cap and form a gas-tight joint about the needle and the nut 35 of the packing gland 36 also tightened to form a tight joint about the needle and prevent escape of gas. It will thus be seen that escape of gas about the needle will be entirely prevented and when the bottle is shaken, the pressure of the gas will act through the passage 30 to actuate the mechanism 13 and turn the shaft 15 to swing the pointer 14 to an adjusted position such as shown in Fig. 1. The mercury in the bulb 28 will be affected by the temperature of the liquid in the bottle and the pressure developed will actuate the mechanism 16 to rotate the shaft 17 and turn the dial or disk 18 relative to the dial 9 and the pointer 14, and the temperature will be indicated by the position of the scale 23 relative to the pointer mark 25. The position of the pointer or hand 14 relative to the scale 19 will then indicate the gas volume, and its position relative to the scale 21 will indicate the pressure of the gas. It will thus be seen that by merely glancing at the gauge through the transparent closure 8, the temperature of the liquid and the volume and pressure of the gas may be ascertained and separate readings and calculations will be eliminated.

It is to be understood that in addition to the specific use set forth above, the gauge may be used on carbonators and filling machines for indicating the gas volume that the apparatus should be delivering to the bottles and thus permit the operator to determine what adjustments are necessary in the gas pressure and water temperature to assure the correct gas volume being delivered into the beverage being produced.

In Figures 5 through 8, there has been illustrated a modified form of gauge wherein a dummy bottle 37 is used and the gauge 38 is applied to the bottom of this bottle. This gauge has a cup-shaped casing 39 which is open at its bottom and has this end normally closed by a transparent disk 40 which is held in place by a retainer ring 41. A neck 42 which is externally threaded projects upwardly from the top of the casing 39 centrally thereof and this neck is screwed into the socket 43 formed centrally of the bottom of the bottle. By this arrangement, the gauge may be applied to a dummy bottle corresponding in shape and size to those actually used for bottling the particular product to be tested and removed from the dummy bottle after a test has been made and transferred to another dummy bottle.

A shank 44 corresponding to the shank or needle 6 passes through the neck 42 and is of such length that its upper portion projects therefrom and into the liquid contents of the bottle 37. A passage 45 extends longitudinally in the shank 44 to the pressure responsive mechanism 46 corresponding to the mechanism 13 and there has also been provided a mercury passage 46′ having an enlargement or bulb chamber 47 at one end filled with mercury 48 which moves through the passage 46′ to operate the thermometer mechanism 49 corresponding to the mechanism 16. This mechanism 49 has a tubular shaft 50 which passes through the partition or dial 51 corresponding to the dial 9 and the mechanism 46 is provided with a shaft 52 extending through the shaft 50 and corresponding to the shaft 15. A dial or disk 53 is carried by the front end of the tubular shaft 50 and at its front end the shaft 52 carries a hand or pointer 54 corresponding to the hand 14. A scale 55 identified as a pounds pressure scale as shown at 56 is provided about the periphery of the dial 51 and this dial also carries an inner temperature scale 57 which is viewed through the opening 58 in the disk 53. Upon the disk or dial 53 is provided a scale 59 which indicates gas volume as shown at 60 and below the opening 58 is provided a pointer mark 61 for cooperating with the scale 57 to indicate the temperature of liquid in the bottle. It will thus be seen that the construction of the gauge carried by the dummy bottle is quite similar to that illustrated in Figures 1 through 4 and after the bottle 37 has been filled and the cap 62 applied, it is merely necessary to shake the bottle and turn it upside-down and look at the dials and the hand 54 through the transparent closure in order to ascertain the temperature of the liquid in the bottle and the volume and pressure of the gas with which the liquid is charged.

I claim:

1. In a gauge of the character described, a casing, a dial in said casing, a shank extending from said casing and being of a length adapting it to extend into a bottle through the neck thereof and into liquid therein, said shank being formed with a pressure passage open at its lower end and a mercury passage having an enlarged bulb forming portion, a column of mercury in the mercury passage and the bulb thereof, an indicator in said casing including pressure responsive mechanism in communication with the mercury passage and a hollow shaft rotatable by the pressure responsive mechanism extending through the dial and carrying an indicator disk of less diameter than the dial, the said disk being formed with an opening to expose a portion of a temperature scale upon the dial, the marginal portions of the dial and the disk having concentric gas-pressure and gas-volume scales thereon, and a second pressure responsive mechanism in said casing carried by said shank and communicating with the pressure passage, said second pressure responsive mechanism having a rotary shaft extending through the hollow shaft and carrying a pointer extending radially of said disk in cooperating relation to the scales about the margins of the disk and the dial.

2. In a gauge for registering temperature and the pressure and volume of gas, a casing, a shank extending from said casing and having a pressure passage with an inlet near its lower end and a mercury bore, a stationary dial in said casing having a temperature scale and a gas pressure scale, an indicator in the casing including pressure responsive mechanism communicating with the mercury bore and a disk rotatable by the pressure responsive mechanism partially concealing said dial, the disk bearing a gas volume scale and a pointer mark cooperating with the temperature scale, and pressure responsive means in said casing communicating with said pressure passage and including a pointer for cooperating with the pressure scale and the volume scale.

3. In a gauge for registering temperature and the pressure and volume of gas, a casing having a transparent wall at one end, a dial in said casing viewed through the transparent wall and bearing a pressure scale about its periphery and a temperature scale, concentric to the pressure scale a disk covering the portion of said dial carrying the temperature scale and exposing the pressure scale, said disk bearing a gas volume scale about its margin and being formed with an opening exposing a portion of the temperature scale, a pointer mark upon said disk at its opening for cooperating with the temperature scale, a shank extending from said casing, the shank being formed with a mercury column and a longitudinally extending pressure passage having an inlet near its lower end, actuating means for said disk operable by the mercury column and including a rotatable shaft carrying said disk, and pressure responsive means in said casing communicating with said passage and including a rotatable shaft carrying a pointer extending radially of the disk for cooperating with the pressure scale and the volume scale.

4. In a gauge for registering temperature and the pressure and volume of gas, a casing having a transparent wall, a shank extending from said casing, said shank being formed with a mercury column and a longitudinally extending pressure passage having an inlet near its outer end, a dial in said casing viewed through the transparent wall and bearing a pressure scale and a temperature scale, a pressure responsive mechanism in said casing operated by the column of mercury extending longitudinally in said shank and inculding a rotatable disk disposed between the dial and the transparent wall in cooperating relation to the dial and bearing a volume scale, and a second pressure responsive mechanism in said casing operated by gas pressure passing through said pressure passage formed longitudinally through said shank and including a rotatable shaft carrying a pointer disposed between the disk and the transparent wall in cooperating relation to the pressure scale and the volume scale.

WILLIAM E. DIMMOCK.